Feb. 11, 1941.        W. G. MYLIUS        2,231,677
METER DISCONNECT
Filed March 30, 1938
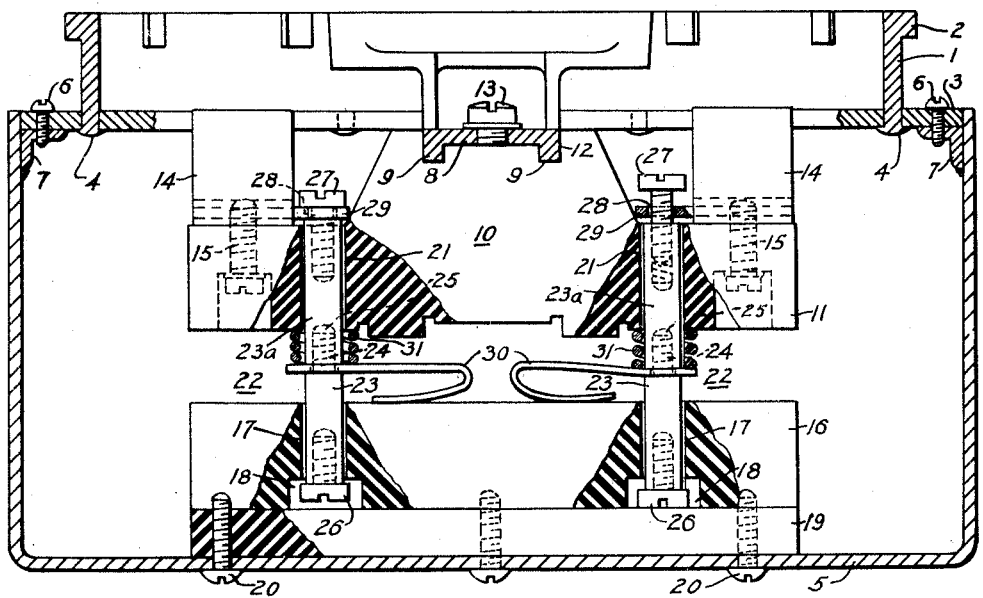
WITNESSES:
INVENTOR
Walter G. Mylius.
BY
ATTORNEY Patented Feb. 11, 1941

2,231,677

UNITED STATES PATENT OFFICE 2,231,677

METER DISCONNECT

Walter G. Mylius, Summit, N. J., assignor to Westinghouse Electric & Manufacturing Company, East Pittsburgh, Pa., a corporation of Pennsylvania Application March 30, 1938, Serial No. 198,865

6 Claims. (Cl. 200—158)

This invention relates to means for disconnecting an electrical circuit, and it relates particularly to a disconnect suitable for meters of the detachable type.

A detachable meter, as shown in my Patent No. 2,071,936, issued February 23, 1937, comprises a meter unit provided with contact blades which are insertable into contact jaws carried by a socket member. Provision generally is made for sealing the meter unit and socket member in operative relationship.

In certain cases, it is desirable to provide convenient means for disconnecting the meter from its supply circuit, and it is desirable further that the disconnecting means be protected by the ordinary meter sealing device. Such protection for the detachable type of meter may be conveniently provided by concealing the disconnect in the socket member of the meter, as shown in my copending application, Serial No. 171,368, filed October 27, 1937, of which this is a continuation-in-part. This co-pending application has matured into Patent No. 2,172,218. Although the disconnect must be capable of carrying heavy currents, space limitations require a compact structure. Moreover, the exacting nature of meter service requires a simple, fool-proof disconnect that is positive in operation.

Accordingly, it is an object of my invention to provide a simple and rugged disconnect.

Another object of my invention is to provide a compact disconnect having a large current carrying capacity.

A still further object of my invention is to provide a disconnect for a detachable type of meter which permits easy assembly and disassembly of the meter installation.

Other objects of my invention will be apparent from the following detailed description taken in conjunction with the accompanying drawing the single figure of which shows a view in sectional elevation of a meter socket embodying my invention, with portions broken away to expose the disconnect assemblies.

Referring to the drawing, a meter socket is disclosed which comprises a ring member 1 having a flange 2 that abuts a flange on a detachable meter (not shown) for sealing purposes. The general relationship of the meter and socket is shown in my aforesaid patent. The ring member 1 may be suitably attached to a face plate 3, as by upsetting portions 4 which extend thorugh the face plate. This face plate is secured to the top of a box or channel housing 5 by any desired means, such as machine screws 6 which are threaded into brackets 7 welded to the housing.

In the specific embodiment illustrated, the ring member 1 is provided with a channel strap 8 having depending ribs 9 for supporting a contact assembly 10. If desired, the channel strap 8 and ring member 1 may be formed separately and united in any known manner, as by welding. The contact assembly 10 may vary appreciably, but the specific modification shown comprises a connection block 11 constructed of electrical insulation or porcelain, having a recess 12 for snugly receiving the channel strap 8 to which it is suitably secured, as by a bolt 13. At desired positions, the block 11 carries contact jaws 14 which are designed to receive the contact blades of a detachable type of meter. The contact jaws may be secured to the block 11 by retaining means such as machine screws 15. For further details of the general construction so far described, reference is made to my aforesaid patent.

In sockets of the type here contemplated, energy for the meter is generally derived from a terminal block 16 which may be formed of insulating material, or may be otherwise insulated from the conducting parts associated therewith. According to my invention, this terminal block is provided with one or more passages 17 terminating in an enlarged recess 18. The enlarged recess 18 may be spaced from the base of the housing 5 by means of a layer 19 which may be conveniently formed from insulating material if the housing is constructed of metal. Any suitable fastening means may be employed for securing the terminal block 16 and layer 19 below the contact assembly 10; a plurality of machine screws 20 being illustrated for this purpose.

Above each passage 17, the block 11 is provided with an aligned opening 21 for slidably receiving a disconnect post 22. The specific post illustrated may be conveniently assembled from a lower rod section 23 having a reduced threaded extension 24 and an upper conductive rod section 23a having a tapped recess 25 for receiving the threaded extension 24, the lower section being screwed into the upper section to form the elongated post 22. Each extremity of the disconnect post 22 is provided with a tapped recess for receiving machine screws 26 and 27. It should be noted that the lower machine screw 26 has a head of sufficient diameter to retain the post 22 in the terminal block 16, but has sufficient clearance in the recess 18 to permit a certain amount of longitudinal movement of the post 22. The reason for this construction will be set forth below. Rotation of the post 22 in the opening 21 may be prevented, if desired, by making the opening and post of square instead of a round cross-section. Similarly, the passage 17 may be made square in cross-section.

Contact between the post 22 and the contact jaw 14 adjacent thereto is effected by means of the cap screw 27 which is provided with an enlarged head as shown. This cap screw passes through a relatively large opening 28 in a conducting strap or lug 29 which is conductively connected to the contact jaw 14. It will be observed that with the screw 27 loose as shown to the right on the drawing, the screw 26 rests on the layer 19 which serves as a limit stop, and the screw 27 and post 22 are out of contact with the strap 29. But when the screw 27 is tightened, it brings the post 22 into firm contact with the strap 29, as shown to the left on the drawing. The enlarged opening 28 provides a clearance entirely around the screw 27, contact being made betwen the strap 29, the lower surface of the screw head, and the upper surface of the post 22. The clearance of the head of the screw 26 in its recess 18 is sufficient to permit the required longitudinal movement of the post 22. As shown to the left on the drawing, when the screw 27 is tightened, the head of the screw 26 is spaced from the upper wall of the recess 18, and no binding is possible.

Connection of the post 22 to the circuit to be metered is made by means of a flexible conducting strap 30 which is fastened between the two sections 23, 23a, the conducting strap 30 having an opening on one end of a size sufficient to receive the threaded extension 24. The flexibility of the conductor permits the necessary freedom of movement of the post 22. The other end of the conducting strap 30 may be connected to a terminal clamp (not shown) of the type disclosed in my aforesaid application and in my Patent No. 2,088,481, issued July 27, 1937

When the screw 27 is loosened, the post 22 normally drops and remains out of contact with the strap 29. If a more positive movement of the post is desired than that depending upon the flexibility of conducting strap 30, I provide a spring 31 for moving the post into its disconnect position. As illustrated, the spring 31 surrounds the post 22 and is held in compression between the contact block 11 and a portion of the strap 30 which is sufficiently rigid to resist the spring thrust. Upon retraction of the screw 27, the spring urges and maintains the post 22 out of contact with the strap 29.

In assembling the socket, the section 23 of each post 22 with its cap screw 26 in place may be inserted through the passage 17, and the strap 30 then may be fastened between the sections 23, 23a. The terminal block 18 and layer 19 are assembled in the housing 5 and fastened in place by the screws 20. After connections between the straps 30 and the circuit to be metered are completed, each spring 31 may be placed over its post 22 and the unit comprising the contact assembly 10, ring member 1 and face plate 3 slipped into place and fastened by the screws 6. Disconnect screws 27 are finally inserted, and the socket is ready to receive a meter. It should be noted that access to the terminal block 18 is readily available simply by removing the screws 6, 27 and raising the contact jaw assembly therefrom. The terminal block retains the posts 22 in alignment, thereby facilitating reinsertion of the contact jaw assembly.

In order to operate the disconnect, the detachable meter is removed from its socket and the screw 27 loosened to disconnect the circuit or tightened to reestablish the circuit. When the meter is replaced, its sealing means effectively protects the disconnect against tampering. One disconnect assembly is shown for each jaw 14 in the drawing, but obviously only one disconnect assembly may be employed in the socket, or disconnects may be employed for any desired number of the jaws.

Although a specific embodiment of my invention has been disclosed, it is obvious that many modifications thereof fall within the scope of my invention. My invention, therefore, is to be limited only by the following claims as interpreted in view of the prior art.

I claim as my invention:

1. In a mounting for a detachable instrument, a first contact member, a pair of guide structures having openings in which said member is slidably positioned, a contact jaw unit carried by one of said guide structures and having an electro-conductive portion constituting a second contact member positioned in the path of movement of said first contact member and insulated therefrom, a yieldable electroconductive connection fixed to said first contact member between said guide structures, and screw means for sliding said first contact member through said openings into conductive engagement with said second contact member.

2. In a contact making device, a first contact member, a pair of guide structures having openings in which said member is slidably positioned, a second contact member positioned in the path of movement of said first contact member and insulated therefrom, biasing means for urging said contact members apart, and contact actuating means for sliding said first contact member through said openings into conductive engagement with said second contact member, said actuating means comprising an actuating member having a body portion spaced from said second contact member and a head portion, and means for urging said head portion and first contact member towards each other for releasably clamping said second contact member therebetween.

3. In a contact making device, a first contact member, said contact member comprising two detachable portions, a pair of guide structures having openings in which said member is slidably positioned, said structures being positioned on opposite sides of the junction of said portions, an electroconductive connection attached to said first contact member between said portions, a second contact member positioned in the path of movement of said first contact member and insulated therefrom, and contact making means for sliding said first contact member through said openings into conductive engagement with said second contact member.

4. In a mounting for a measuring instrument of the detachable type having a contact blade, a contact jaw for receiving said contact blade, a connection block for supporting said contact jaw, a terminal block adjacent said connection block, said blocks having a pair of aligned passages, a conductive lug extending from said contact jaw, said lug having a portion aligned with said passages, a contact member slidably positioned in said passages for movement into and out of conductive engagement with said lug, biasing means for urging said contact member away from said lug, and releasable means for forcing said contact member into engagement with said lug.

5. In a mounting for a measuring instrument of the detachable type having a contact blade, a contact jaw for receiving said contact blade, a connection block for supporting said contact jaw, a terminal block adjacent said connection block, said blocks having a pair of aligned passages, a conductive lug extending from said contact jaw, said lug having a portion aligned with said passages, a contact member slidably positioned in said passages for movement into and out of conductive engagement with said lug, means for retaining said contact member in said terminal block, said means permitting a limited movement of said contact member, biasing means for urging said contact member away from said lug, and releasable means for forcing said contact member into engagement with said lug.

6. In a mounting for a measuring instrument of the detachable type having a contact blade, a contact jaw for receiving said contact blade, a connection block for supporting said contact jaw, a terminal block adjacent said connection block, said blocks having a pair of aligned passages, a conductive lug extending from said contact jaw, said lug having a portion aligned with said passages, a contact member slidably positioned in said passages for movement into and out of conductive engagement with said lug, means for retaining said contact member in said terminal block, said means permitting a limited movement of said contact member, a conductive connection to said contact member intermediate said blocks, biasing means for urging said contact member away from said lug, and releasable means for forcing said contact member into engagement with said lug.

WALTER G. MYLIUS.